US012576602B2

(12) United States Patent
Ghazizadeh et al.

(10) Patent No.: US 12,576,602 B2
(45) Date of Patent: Mar. 17, 2026

(54) METHOD OF PRODUCING COMPOSITES

(71) Applicant: Nanocomp Technologies, Inc., The Woodlands, TX (US)

(72) Inventors: Mahdi Ghazizadeh, The Woodlands, TX (US); Eitan Zeira, Merrimack, NH (US); Derek Kincaid, The Woodlands, TX (US); David Hatrick, The Woodlands, TX (US)

(73) Assignee: Huntsman Nanocamp LLC, The Woodlands, TX (US)

( * ) Notice: Subject to any disclaimer, the term of this patent is extended or adjusted under 35 U.S.C. 154(b) by 0 days.

(21) Appl. No.: 18/662,712

(22) Filed: May 13, 2024

(65) Prior Publication Data

US 2024/0293981 A1     Sep. 5, 2024

Related U.S. Application Data

(62) Division of application No. 17/299,866, filed on Jun. 4, 2021, now Pat. No. 12,017,421.

(51) Int. Cl.
| | |
|---|---|
| *B29C 70/54* | (2006.01) |
| *B29C 35/12* | (2006.01) |
| *B29C 70/30* | (2006.01) |
| *B29L 9/00* | (2006.01) |

(52) U.S. Cl.
CPC .............. *B29C 70/54* (2013.01); *B29C 35/12* (2013.01); *B29C 70/30* (2013.01); *B29K 2713/00* (2013.01); *B29K 2995/0005* (2013.01); *B29L 2009/00* (2013.01)

(58) Field of Classification Search
CPC ......... B29C 70/54; B29C 35/12; B29C 70/30; B29K 2713/00; B29K 2995/0005; B29L 2009/00
See application file for complete search history.

(56) References Cited

U.S. PATENT DOCUMENTS

| | | | |
|---|---|---|---|
| 2009/0277897 A1* | 11/2009 | Lashmore | H01B 1/04 |
| | | | 219/544 |
| 2013/0087278 A1 | 4/2013 | Chang et al. | |
| 2016/0082691 A1 | 3/2016 | Restuccia et al. | |
| 2017/0129207 A1 | 5/2017 | Hallander et al. | |
| 2017/0173895 A1 | 6/2017 | Williams | |
| 2018/0111338 A1 | 4/2018 | Xu et al. | |
| 2020/0354531 A1* | 11/2020 | Vashisth | B29C 70/502 |

FOREIGN PATENT DOCUMENTS

WO     2018130735 A1     7/2018

OTHER PUBLICATIONS

Machine translation of RU 2698806 C1 (Year: 2018).*
Extended European Search Report issued Sep. 4, 2024, in corresponding European Application No. 19897265.5.

* cited by examiner

*Primary Examiner* — Vishal I Patel
(74) *Attorney, Agent, or Firm* — Huntsman Nanocamp LLC

(57) ABSTRACT

A method of producing composites that are capable of being used in various industries, including the aerospace and automotive industries. In particular, the present disclosure relates to methods of curing one or more prepregs and/or a liquid curable composition using one or more self-supporting, nonwoven carbon nanotube sheets comprising substantially non-aligned carbon nanotubes.

10 Claims, 2 Drawing Sheets

METHOD OF PRODUCING COMPOSITES

CROSS REFERENCE TO RELATED APPLICATIONS

The present application is a divisional application of U.S. patent application Ser. No. 17/299,866, filed Jun. 4, 2021. The noted application is incorporated herein by reference.

STATEMENT REGARDING FEDERALLY SPONSORED RESEARCH OR DEVELOPMENT

Field

Not applicable.

The present disclosure generally relates to a method of producing composites capable of being used in, for example, the aerospace and automotive industries. In particular, the present disclosure relates to methods of curing prepregs and/or liquid curable compositions using one or more self-supporting, nonwoven carbon nanotube sheets comprised of substantially non-aligned carbon nanotubes.

BACKGROUND

Current methods of forming composites rely on the use of externally applied elevated temperatures to heat curable systems such as prepregs and liquid resins. However, curing is typically an exothermic reaction, which produces additional heat that needs to be controlled to prevent excessive heating within the curable system. Overheating the curable system can damage both the curable system and the composites produced therefrom, as well as any moulds used to shape the composites during the curing process.

The thicker the curable system (e.g., the number of prepregs in a stack or preform), the higher the propensity for the curable system to overheat. Therefore, the curing process for thicker curable systems needs to be especially controlled to reduce the risk for excessive temperatures generated in the curable system and avoid excessive heating and runaway curing. Excessive heating (and subsequent overheating) is generally due to the inability to effectively control the amount of heat applied to the curable system when using externally applied elevated temperatures. One way to avoid overheating is to ensure that the cure cycle is sufficiently long to avoid creating excessive heat within the curable system. However, such a process is both time and cost intensive.

It would therefore be advantageous to provide a method of curing curable compositions in a more efficient and/or controlled manner to form composites as compared to current methods of using externally applied elevated temperatures.

FIGURES

DETAILED DESCRIPTION

Figure 1:
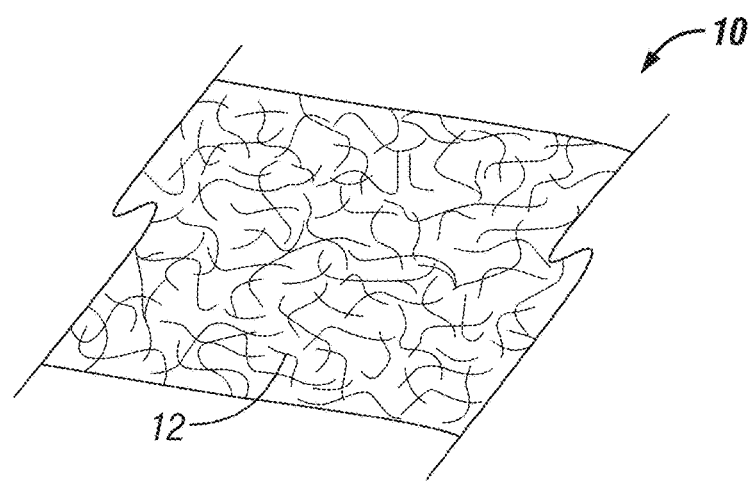
FIG. 1 is a representative illustration of a non-woven carbon nanotube sheet.

Before explaining at least one embodiment of the present disclosure in detail, it is to be understood that the present disclosure is not limited in its application to the details of construction and the arrangement of components or steps or methodologies set forth in the following description. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference and to the extent that they do not contradict the instant disclosure.

All of the compositions and/or methods disclosed herein can be made and executed without undue experimentation in light of the present disclosure. While the compositions and methods of the present disclosure have been described in terms of embodiments or preferred embodiments, it will be apparent to those having ordinary skill in the art that variations may be applied to the compositions and/or methods and in the steps or sequences of steps of the methods described herein without departing from the concept, spirit, and scope of the present disclosure. All such similar substitutes and modifications apparent to those skilled in the art are deemed to be within the spirit, scope, and concept of the present disclosure.

Any of the embodiments herein referencing carbon nanotubes may also be modified within the spirit and scope of the disclosure to substitute other tubular nanostructures, including, for example, inorganic or mineral nanotubes. Inorganic or mineral nanotubes include, for example, silicon nanotubes, boron nanotubes, and carbon nanotubes having heteroatom substitution in the nanotube structure.

As utilized in accordance with the present disclosure, the following terms, unless otherwise indicated, shall be understood to have the following meanings.

The use of the word "a" or "an", when used in conjunction with the term "comprising", "including", "having", or "containing" (or variations of such terms) may mean "one", but it is also consistent with the meaning of "one or more", "at least one", and "one or more than one".

The use of the term "or" is used to mean "and/or" unless clearly indicated to refer solely to alternatives and only if the alternatives are mutually exclusive.

Throughout this disclosure, the term "about" is used to indicate that a value includes the inherent variation of error for the quantifying device, mechanism, or method, or the inherent variation that exists among the subject(s) to be measured. For example, but not by way of limitation, when the term "about" is used, the designated value to which it refers may vary by plus or minus ten percent, or nine percent, or eight percent, or seven percent, or six percent, or five percent, or four percent, or three percent, or two percent, or one percent, or one or more fractions therebetween.

The use of "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it refers. In addition, the quantities of 100/1000 are not to be considered as limiting since lower or higher limits may also produce satisfactory results.

In addition, the phrase "at least one of X, Y, and Z" will be understood to include X alone, Y alone, and Z alone, as well as any combination of X, Y, and Z. Likewise, the phrase "at least one of X and Y" will be understood to include X alone, Y alone, as well as any combination of X and Y. Additionally, it is to be understood that the phrase "at least one of" can be used with any number of components and have the similar meanings as set forth above.

The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The phrases "or combinations thereof" and "and combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms such as BB, AAA, CC, AABB, AACC, ABCCC, CBBAAA, CABBB, and so forth. The skilled artisan will understand that typically there is no limit on the number of items or terms in any combination, unless otherwise apparent from the context. In the same light, the terms "or combinations thereof" and "and combinations thereof" when used with the phrases "selected from" or "selected from the group consisting of" refers to all permutations and combinations of the listed items preceding the phrase.

The phrases "in one embodiment", "in an embodiment", "according to one embodiment", and the like generally mean the particular feature, structure, or characteristic following the phrase is included in at least one embodiment of the present disclosure, and may be included in more than one embodiment of the present disclosure. Importantly, such phrases are non-limiting and do not necessarily refer to the same embodiment but, of course, can refer to one or more preceding and/or succeeding embodiments. For example, in the appended claims, any of the claimed embodiments can be used in any combination.

As used herein, the terms "% by weight", "wt %", "weight percentage", or "percentage by weight" are used interchangeably.

The phrase "substantially free" shall be used herein to mean present in an amount less than 1 weight percent, or less than 0.1 weight percent, or less than 0.01 weight percent, or alternatively less than 0.001 weight percent, based on the total weight of the referenced composition.

As used herein, the term "ambient temperature" refers to the temperature of the surrounding work environment (e.g., the temperature of the area, building or room where the curable composition is used), exclusive of any temperature changes that occur as a result of the direct application of heat to the curable composition to facilitate curing. The ambient temperature is typically between about 10° C. and about 30° C., more specifically about 15° C. and about 25° C. The term "ambient temperature" is used interchangeably with "room temperature" herein.

The term "composite", as used herein, refers to a material made from two or more individual components having different physical or chemical properties, that when combined, produce a material with characteristics different from the individual components.

The term "composite laminate" refers to an article made from two or more layers (can be same or different) of composite materials. For example, a composite laminate may comprise two or more layers of prepregs.

The terms "composite", "composite laminate", and "laminate" can be used interchangeably herein.

The term "prepreg" is used to describe a fibrous material impregnated with a curable resin in the uncured or partially cured state and ready for curing. As used herein, the term "prepreg" refers to a prepreg ply, both of which may be used interchangeably. The plural "prepregs" refers to multiple prepreg plies.

Carbon Nanotubes

Carbon nanotubes as used in connection with the present disclosure may be fabricated using a variety of approaches. Presently, there exist multiple processes and variations thereof for growing nanotubes, including: (1) Chemical Vapor Deposition (CVD), a common process that can occur at near ambient or at high pressures, and at temperatures above about 400° C., (2) Arc Discharge, a high temperature process that can give rise to tubes having a high degree of perfection, and (3) Laser ablation.

Carbon nanotubes, including single wall (SWNT), double wall (DWNT), and multiwall (MWNT), may be grown, in some embodiments, by exposing nanoscale catalyst particles in the presence of reagent carbon-containing gases (i.e., gaseous carbon source at elevated temperatures). In particular, the nanoscale catalyst particles may be introduced into a high heat environment along with the reagent carbon-containing gases, either by addition of existing particles or by in situ synthesis of the particles from a metal-organic precursor, or even non-metallic catalysts.

In some embodiments, the carbon nanotubes ("CNTs") can have a length greater than about 1 micrometer, or about 10 micrometers, or about 50 micrometers, or about 100 micrometers. In other embodiments, the CNTs can have a length greater than about 150 micrometers, or greater than about 200 micrometers, or greater than about 250 micrometers, or greater than about 300 micrometers, or greater than about 350 micrometers, or greater than about 400 micrometers, or greater than about 450 micrometers, or greater than about 500 micrometers.

The strength of the individual nanotubes used in connection with the present disclosure may be about 30 GPa or more. Strength, as should be noted, is generally sensitive to defects. However, the elastic modulus of individual carbon nanotubes fabricated in accordance with the CVD process as previously noted may not be sensitive to defects and can be of about 1 TPa. Moreover, the strain to failure, which generally can be a structure sensitive parameter, may range from about 10% to about 25% for carbon nanotubes used in connection with the present disclosure.

Furthermore, the nanotubes of the present disclosure can be provided with relatively small diameter. In some embodiments of the present disclosure, the nanotubes can be provided with a diameter in a range of from about 1 nanometer to about tens of nanometers.

Such carbon nanotubes can be made into structures having hierarchical morphologies of increasing complexity. The general structures formed are, but not limited to, CNT sheets, yarns, and powders (e.g. bundles, fibers, or other entities). Such nanofibrous macrostructure can be extendible.

Systems and methods of forming such carbon nanotubes and structures thereof, including carbon nanotube sheets, are described in more detail in U.S. Pat. No. 7,993,620, which is incorporated herein by reference in its entirety.

Carbon Nanotube Sheet

As used herein, the term "carbon nanotube sheet" is generally directed to a non-woven article of carbon nanotubes (including those as previously described herein) having the general appearance of a sheet and sufficient structural integrity to be handled as a sheet. That is, in one embodiment, the carbon nanotube sheet is a self-supporting, non-woven sheet of substantially non-aligned carbon nanotubes. Such a sheet may be, for example but without limitation, generated from a matrix of compacted, substantially non-aligned, and intermingled carbon nanotubes, bundles of carbon nanotubes, or intertwined carbon nanotubes, with sufficient structural integrity to be handled as a sheet.

Figure 2:
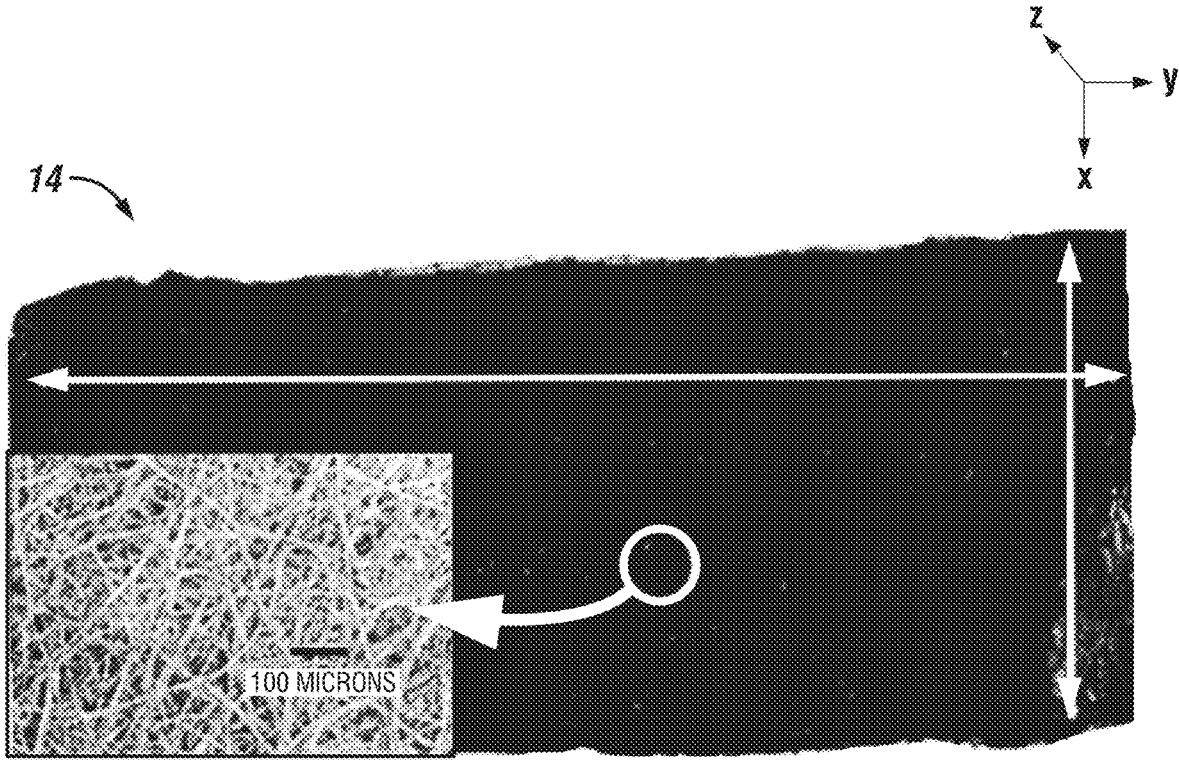
FIG. 2 illustrates a non-woven carbon nanotube sheet.

In one particular embodiment, the carbon nanotube sheet comprises a single layer of a plurality of non-woven carbon nanotubes oriented in relation to one another such that there are sufficient contacts rendering the single layer capable of being handled as a sheet. FIG. 1 depicts an illustration of a non-limiting example of a carbon nanotube sheet 10. The carbon nanotube sheet can be so designed to allow electrical conductivity along its length, i.e., within its plane. The carbon nanotube sheet 10 may, in one embodiment, be a single layer of a plurality of non-woven carbon nanotubes 12 deposited on top of one another. FIG. 2 depicts another non-limiting embodiment of a carbon nanotube sheet 14, along with a perspective of the x, y, and z-axes associated with such.

In another embodiment, the carbon nanotube sheet comprises multiple layers of non-woven, substantially non-aligned carbon nanotubes, wherein each layer comprises a plurality of non-woven carbon nanotubes, and wherein the carbon nanotubes and layers of carbon nanotubes are oriented such that the carbon nanotube sheet has sufficient contacts between layers to be handled as a sheet.

For instance, in one non-limiting embodiment, the carbon nanotube sheet comprises a plurality of discernible layers of carbon nanotubes, wherein each layer of the non-woven carbon nanotube sheet includes a plurality of intermingled carbon nanotubes, and wherein the carbon nanotubes of each layer are compacted such that the layers are still distinguishable from one another within the non-woven sheet, and wherein an adequate number of contact sites exist between the nanotubes so as to provide the non-woven carbon nanotube sheet with the necessary bonding strength to form a continuous structure that can be handled like a sheet.

As used herein, "substantially non-aligned" means that the degree of alignment of the carbon nanotubes may be less than 30%, or less than 20%, or less than 15%, or less than 10%, or less than 5%, or less than 1% alignment based on the total number of carbon nanotubes. In any case, "substantially non-aligned" definitively means that the carbon nanotubes are not substantially vertically aligned.

In an alternative embodiment, the carbon nanotubes of the carbon nanotube sheet may be stretched in the "y" direction only such that the carbon nanotubes have a degree of alignment in the "y" direction of less than 20%, or less than 15%, or less than 10%, or less than 5% based on the total number of carbon nanotubes.

The non-woven carbon nanotube sheet as described herein may have a density of from about 0.1 mg/cm$^2$ to about (or over) 5 mg/cm$^2$.

The non-woven carbon nanotube sheet as described herein may also have a nominal strength ranging from about 10,000 to about 20,000 psi and/or a tensile strength from about 30 Mpa to about 300 Mpa.

In one embodiment, the carbon nanotube sheet has been modified to have a connector portion (e.g., an electrical bussing) at each of the opposing ends of the sheet capable of having electrodes attached thereto such that an electrical current can be passed through the carbon nanotube sheet.

The connector portion may be a coating deposited, such as electroplating, directly on each end of conducting member. Deposition or electroplating of the connector portion on the carbon nanotube sheet can be carried out using methods well known in the art. Examples of an electroplated connector portion include gold, silver, nickel, aluminum, copper, bismuth, tin, zinc, cadmium, tin-nickel alloy, copper alloy, tin-zinc alloy, bismuth-copper alloy, copper-nickel alloy, cadmium-nickel alloy, other conductive metals and their alloys, or a combination thereof. In an embodiment, one or more of the connector portions may be located anywhere on the carbon nanotube sheet. In one embodiment, the connector portion may be a piece of conductive material mechanically or chemically attached to each of the opposing ends of the carbon nanotube sheet such that an electrical current can be passed through the carbon nanotube sheet.

The connector portion, in an embodiment, may be deposited or electroplated on to the opposing ends of the carbon nanotube sheet substantially uniformly, so as to permit substantially uniform contact of the nanotubes in conducting across a contact surface area on the connector portion. As such, the connector portion can act to substantially maximize the number of conductive nanostructures within the carbon nanotube sheet that can be actively involved in conductivity to enhance efficiency of electrical and thermal transport and reduce contact resistance. To that end, relatively high current from a source and carried by the carbon nanotube sheet can be directed to an external circuit without substantial degradation.

The connector portion, in an embodiment, when coupled to the carbon nanotube sheet, permits relatively high current from a source that may be carried by the carbon nanotube sheet to be directed to an external circuit without substantial degradation. To do so, the carbon nanotube sheet may further include a coupling mechanism to enhance contact between the ends of the carbon nanotube sheet to the connector portion. In one embodiment, the coupling mechanism may be made from a glassy carbon material capable of providing substantially low resistance coupling. Glassy carbon, in general, may be a form of carbon related to carbon nanotubes and can contain a significant amount of graphene like ribbons comprising a matrix of amorphous carbon. These ribbons include sp$^2$ bonded ribbons that can be substantially similar to the sp$^2$ bonded nanotubes. As a result, they can have relatively good thermal and electrical conductivity. Examples of precursor materials from which glassy carbon can be made include furfuryl alcohol, RESOL resin (i.e., catalyzed alkyl-phenyl formaldehyde), polyvinyl alcohol ("PVA"), or liquid resin or any material known to form glassy carbon when heat treated. Of course, other commercially available glassy carbon materials or precursor materials can be used.

In addition, the coupling mechanism may also provide the carbon nanotube sheet with substantially uniform contact to the connector portion across a contact surface area on the connector portion. To that end, the coupling mechanism can act to substantially maximize the number of conductive nanostructures within the carbon nanotube sheet that can be actively involved in conductivity to enhance efficiency of electrical and thermal transport. For instance, relatively high current from a source and carried by the carbon nanotube sheet can be directed to an external circuit without substantial degradation. The carbon nanotube sheet of the present disclosure, thus, can be used to enable efficient conduction to a standard connector for use in a traditional thermal and/or electrical circuit systems.

In an embodiment, the connector portion of the carbon nanotube sheet may be impregnated with epoxy, polymeric resin, or another type of bonding agent to increase structural integrity.

Additional examples of the connector portion and coupling mechanism as described herein can be found in U.S. Pat. No. 9,198,232, which is incorporated by reference herein in its entirety.

Figure 3:
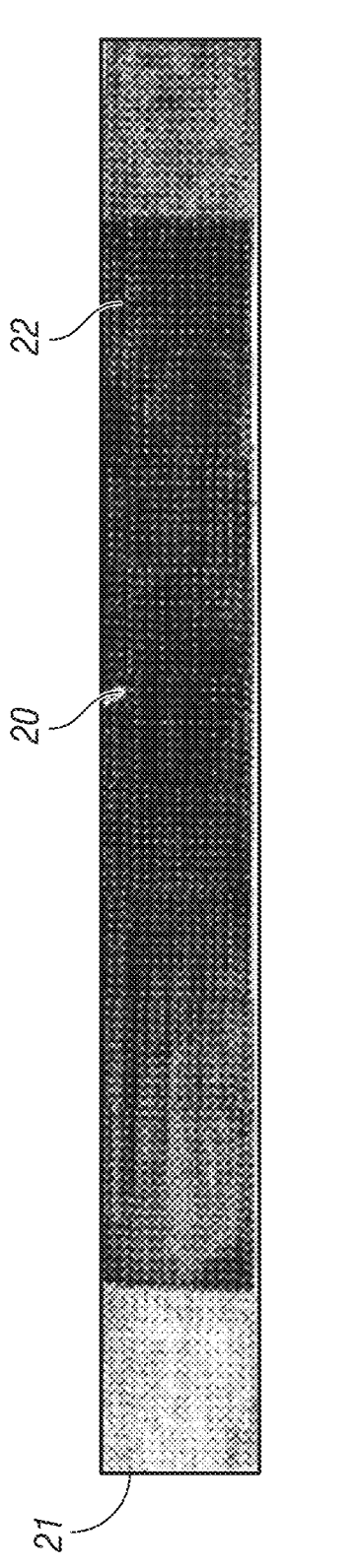
FIG. 3 illustrates a non-woven carbon nanotube sheet having a connector portion and a coupling mechanism.
Figure 3:
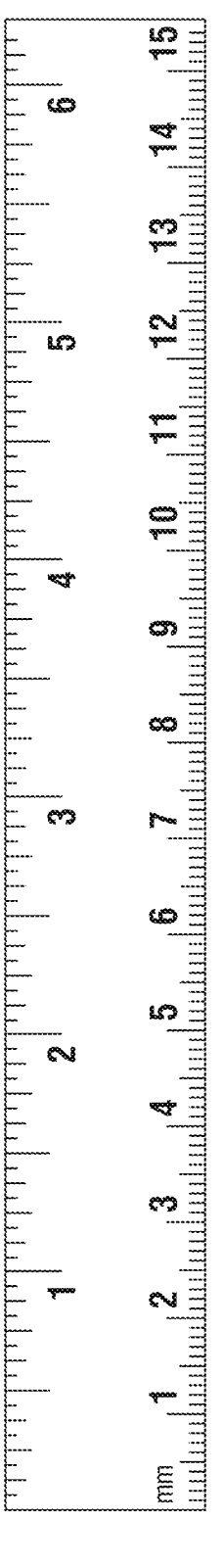

FIG. 3 illustrates a non-limiting embodiment of a carbon nanotube sheet 20 with a connector portion 21 and a coupling mechanism 22.

Curable System

According to one aspect, the present disclosure is directed to a curable system comprising a prepreg and one or more carbon nanotube sheets located on top and/or bottom of the prepreg.

In another aspect, the present disclosure is directed to a curable system comprising (i) a stack of two or more prepregs, and (ii) one or more carbon nanotube sheets, wherein at least one of the carbon nanotube sheets is placed in-between the two or more prepregs.

The one or more carbon nanotube sheets do not need to be placed in-between every prepreg in the stack. However, it is envisioned that in one embodiment, a carbon nanotube sheet could be placed in-between each prepreg and, optionally, on top of and/or on bottom of the prepreg stack. In another embodiment, the carbon nanotube sheets can be placed in different locations throughout the stack of prepregs.

In one particular embodiment, one or more carbon nanotube sheets are placed at or substantially near the middle of the stack of prepregs such that the thickness of the prepregs is substantially the same on both sides of the one or more carbon nanotube sheets.

Each prepreg of the present disclosure comprises a mixture of a fiber reinforcement and a curable resin. The fiber reinforcement, of course, comprises fibers. In one embodiment, the fiber reinforcement is in the form of, for example, a bundle or layer of fibers. The fiber reinforcement can be constructed from unidirectional fibers, woven fibers, chopped fibers, non-woven fibers or long, discontinuous fibers.

In one embodiment, the fibers are selected from conductive fibers, nonconductive fibers, and a combination thereof.

In particular, the fibers may be selected from glass, such as S glass, S2 glass, E glass, R glass, A glass, AR glass, C glass, D glass, ECR glass, glass filament, staple glass, T glass, and zirconium glass, carbon polyacrylonitrile, carbon fiber, acrylic, poly-paraphenylene terephthalamide, silica, aramid, boron, polyalkylene, quartz, polybenzimdazole, polyetherketone, polyphenylene sulfide, poly p-phenylen benzobisoxazole, silicon carbide, phenolformaldehdye, phthalate, naphthenoate, and combinations thereof.

In one embodiment, the fiber reinforcement is substantially free of carbon nanotubes.

In another embodiment, when the fiber reinforcement contains conductive fibers, the curable system further requires (i) a non-conductive separator to be placed between the carbon nanotube sheet(s) and the prepreg(s) or (ii) for the carbon nanotube sheet(s) to be at least partially impregnated with a curable resin. The curable resin in the carbon nanotube sheet(s) can be the same or different as the curable resin in the prepreg(s).

Without intending to be bound by theory, it is thought that having the carbon nanotube sheet in direct contact with a prepreg containing conductive fibers may cause a short circuit if running an electrical current through the carbon nanotube sheet (as will be described in more detail herein) to cure the prepreg(s).

In yet another embodiment, the one or more carbon nanotube sheets are substantially free of the curable resin and remain substantially free in the curable system due to the non-conductive separator placed between the prepregs and the one or more carbon nanotube sheets.

The curable resin can be selected from, for example but without limitation, polyimides, polyvinylidene fluorides, polyetherimides, polyamides, poly-acrylonitrile butadiene styrenes, polyphenylene sulfides, polystyrenes, polycarbonates, polylactic acids, polyether ether ketones, polyetherketoneketones, fluorinated ethylene propylenes, polyvinyl alcohols, and combinations thereof.

Additional non-limiting examples of the curable resin include, but are not limited to, epoxy resin, cyanate ester resin, maleimide resin, bismaleimide-triazine resin, phenolic resin, resorcinolic resin, unsaturated polyester resin, diallylphthalate resin, urea resin, melamine resin, benzoxazine resin (e.g., multi-functional n-phenyl benzoxazine resins such as phenolphthaleine based, thiodiphenyl based, bisphenol A based, bisphenol F based, dicyclopentadiene based benzoxazine resins), polyurethane, and their mixtures thereof. An example of a suitable mixture could be a mixture of an epoxy resin and a benzoxazine resin.

The epoxy resins can be di-functional or higher epoxy resins. Such epoxy resins are prepared from precursors such as amines (e.g., tetraglycidyldiaminodiphenylmethane, triglycidyl-p-aminophenol, triglycidyl-m-aminophenol and triglycidylaminocresol and their isomers), phenols (e.g., bisphenol A epoxy resins, bisphenol F epoxy resins, bisphenol S epoxy resins, phenol-novolack epoxy resins, cresol-novolac epoxy resins and resorcinol epoxy resins), and compounds having a carbon-carbon double bond (e.g., alicyclic epoxy resins). It should be noted that the epoxy resins are not restricted to the examples above. Halogenated epoxy resins prepared by halogenating these epoxy resins can also be used. Furthermore, mixtures of two or more of these epoxy resins, and monoepoxy compounds can be employed in the curable resin.

In one embodiment, the curable resin can be combined with one or more additives, including, for example but without limitation, catalysts or curing agents, antioxidants, toughening agents, UV stabilizers, and fire retardants.

In one embodiment, the carbon nanotube sheet has a connector portion (as previously described) at each of the opposing ends of the sheet capable of having electrodes attached thereto such that an electrical current can be passed through the carbon nanotube sheet.

The connector portion can be attached to each end of the carbon nanotube sheet either before or after assembly of the curable systems as described herein.

The prepreg or stack of prepregs can have a thickness ranging from about 0.1 mm to about 160 mm, or from about 1 mm to about 160 mm, or from about 5 mm to about 155 mm, or from about 10 mm to about 140 mm, or from about 20 mm to about 130 mm, or from about 50 mm to about 100 mm, or from about 50 mm to about 80 mm.

In another aspect, the present disclosure is directed to a method of producing a curable system, comprising (i) providing two or more prepregs and one or more carbon nanotube sheets as described herein, (ii) optionally injecting a curable resin into the carbon nanotube sheet so as to form a prepregged carbon nanotube sheet, and (iii) placing one or more of the carbon nanotube sheets between at least two of the prepregs.

In one embodiment, the one or more carbon nanotube sheets has already been injected with one or more curable resins so as to form a prepregged carbon nanotube sheet(s).

In another embodiment, the method of producing a curable system further comprises attaching a connector portion on each of the opposing ends of the one or more carbon nanotube sheets capable of having electrodes attached thereto such that an electrical current can be passed through the carbon nanotube sheet.

In an alternative embodiment, the connector portions on each of the opposing ends of the one or more carbon nanotube sheets have already been attached thereto prior to placing the one or more carbon nanotube sheets between at least two of the prepregs.

In yet another embodiment, the method of producing a curable system also comprises a step whereby a non-conductive separator is placed between each carbon nanotube sheet and the prepreg(s).

Curing a Single Prepreg or Stack of Prepregs

One particular aspect of the present disclosure is directed to a method of curing a single prepreg with a carbon nanotube sheet to form a composite laminate. The method includes (i) providing a curable system comprising a prepreg and one or more carbon nanotube sheets, wherein at least one of the carbon nanotube sheets is placed on top and/or bottom of the prepreg; and (ii) at least partially curing the curable system by either (a) running an electric current through the one or more carbon nanotube sheets such that at least a portion of the prepregs are cured, (b) subjecting the curable system to alternating electromagnetic fields (EMFs) such that at least a portion of the prepregs are cured, or (c) both running an electric current through the one or more carbon nanotube sheets and subjecting the curable system to alternating electromagnetic fields such that at least a portion of the prepregs are cured.

In another aspect, the present disclosure is directed to a method of curing a stack of prepregs with one or more carbon nanotube sheets to form a composite laminate. The method includes (i) providing a curable system comprising a stack of two or more prepregs and one or more carbon nanotube sheets, wherein at least one of the carbon nanotube sheets is placed in-between the two or more prepregs; and (ii) at least partially curing the curable system by either (a) running an electric current through the one or more carbon nanotube sheets such that at least a portion of the prepregs are cured, (b) subjecting the curable system to alternating electromagnetic fields (EMFs), or (c) both running an electric current through the one or more carbon nanotube sheets and subjecting the curable system to alternating electromagnetic fields such that at least a portion of the prepregs are cured.

In one embodiment, the carbon nanotube sheet is a self-supporting, nonwoven sheet comprising substantially non-aligned carbon nanotubes. Without intending to be bound by any one particular theory, it is believed that a carbon nanotube sheet comprising substantially non-aligned carbon nanotubes has improved randomization of heat generated when running an electric current through the carbon nanotube sheet and/or subjecting the curable system to alternating electromagnetic fields, which helps radiate/distribute the heat more uniformly in all directions from the carbon nanotube sheets thereby resulting in a more uniform cure of the prepreg.

In another embodiment, the curable system is not just partially cured but is substantially or completely cured by running an electric current through the carbon nanotube sheet(s) and/or subjecting the curable system to alternating electromagnetic fields.

Alternatively, the curable system may be cured by the aforementioned methods used in combination with typical curing techniques including, for example, exposing the curable system to externally applied elevated temperatures. The externally applied elevated temperatures can be in a range of, for example but without limitation, 70° C. to 110° C., and optionally, with elevated pressures. Even if such externally applied elevated temperatures are used, it is believed that the energy required will be significantly reduced due to the controlled, efficient distribution of heat from the internal distribution of controlled, evenly distributed heat from the one or more carbon nanotube sheets.

The step of running an electric current through the one or more carbon nanotube sheets includes connecting electrodes to two sides (e.g., two opposing ends) of the carbon nanotube sheet to form a circuit(s) and supplying electric power in an amount ranging from about 0.5 W/in$^2$ to 50 W/in$^2$ in order to result in resistive infrared heating by the carbon nanotube sheets. The voltage of the electric current that can be run through the one or more carbon nanotube sheets can range from about 1 to 10 V. In one embodiment, the electrodes are connected to connectors that are attached to the one or more carbon nanotube sheets.

As would be appreciated by a person of ordinary skill in the art, the amount of infrared heat generated by the carbon nanotube sheet can be controlled depending on the amount of electric power supplied to the one or more carbon nanotube sheets. As such, the curing conditions of a single prepreg or stack of prepregs can be actively controlled to avoid excessive heating and run away cure and likewise avoid causing damage to moulds holding the stack of prepregs or the prepregs themselves. Such ability to actively control the curing conditions of the prepreg or stack of prepregs leads to a substantially uniform cure for the resulting composite.

In the case of curing a stack of prepregs with one or more carbon nanotube sheets, the electric power provided for each carbon nanotube sheet may be the same as or different for each carbon nanotube sheet so as to have controlled heating and curing for the curable system. For example, a prepreg stack having a tapering thickness may have multiple carbon nanotube sheets incorporated therein that receive varying electric power inputs so that the thickest sections will uniformly cure at the same or similar rates as the thinner sections of the prepreg stack thereby resulting in a substantially uniformly cured composite.

The step of subjecting the curable system to alternating electromagnetic fields can include using a radiating source to emit an electromagnetic field creating an eddy current within the carbon nanotube sheets and generating inductive heating.

Curing a Liquid Curable Resin

Another aspect of the present disclosure is directed to a method of curing a liquid curable composition. The method includes (i) contacting a carbon nanotube sheet with a curable composition, wherein the amount of curable composition contacted with the carbon nanotube sheet is sufficient so as to form a layer on the carbon nanotube sheet having a thickness of from about 1 mm to 160 mm, or from about 5 mm to about 155 mm, or from about 10 mm to about 140 mm, or from about 20 mm to about 130 mm, or from about 50 mm to about 100 mm, or from about 50 mm to about 80 mm; and (ii) at least partially curing the liquid curable composition (i.e., curing the liquid curable composition to the extent that the liquid curable composition is at least partially cured) by either (a) running an electric current through the one or more carbon nanotube sheets such that at least a portion of the liquid curable composition is cured, (b) subjecting the curable system to alternating electromagnetic fields (EMFs) such that at least a portion of the liquid curable composition is cured, or (c) both running an electric current through the one or more carbon nanotube sheets and subjecting the curable system to alternating electromagnetic fields such that at least a portion of the liquid curable composition is cured.

In one embodiment, the carbon nanotube sheet is a self-supporting, nonwoven sheet of substantially non-aligned carbon nanotubes.

In one particular embodiment, the one or more carbon nanotube sheets are in a mould having a particular shape.

In another embodiment, the carbon nanotube sheet is at least partially covered in a silicone substrate and/or a laminate of a polyolefin, a nylon, a fluorinated polymer, ethylene-vinyl acetate, or a combination thereof. Non-limiting examples of the fluorinated polymer include vinyl fluoride, vinylidene fluoride (i.e., 1,1-difluoroethylene), and tetrafluoroethylene.

The liquid curable composition may be partially, substantially, or entirely cured only by running an electric current through the carbon nanotube sheet(s) and/or subjecting the curable system to alternating electromagnetic fields. Alternatively, the liquid curable composition may be cured by such methods used in combination with typical curing techniques including, for example, exposing the curable system to externally applied elevated temperatures. The externally applied elevated temperatures can be in a range of, for example but without limitation, 70° C. to 110° C., and optionally, with elevated pressures.

The liquid curable composition comprises one or more curable resins as described herein and, optionally, one or more additives including, but not limited to, catalysts or curing agents, antioxidants, toughening agents, UV stabilizers, and fire retardants.

As previously noted, the step of running an electric current through the one or more carbon nanotube sheets includes connecting electrodes to two sides (e.g., two opposing ends) of the carbon nanotube sheet to form a circuit(s) and supplying electric power ranging from 0.5 W/in² to 50 W/in² in order to result in resistive infrared heating by the carbon nanotube sheets. The voltage of the electric current that can be run through the one or more carbon nanotube sheets can range from about 1 to 10 V. In one embodiment, the electrodes are connected to connectors that are attached to the one or more carbon nanotube sheets.

Again, as would be appreciated by a person of ordinary skill in the art, the amount of infrared heat generated by the carbon nanotube can be controlled depending on the amount of electric power supplied to the one or more carbon nanotube sheets. As such, the curing conditions of the liquid curable composition can be actively controlled to avoid excessive heating of the liquid curable composition and run away cure and likewise avoid causing damage to moulds holding the liquid curable composition. Such ability to actively control the curing conditions of the curable compositions leads to a substantially uniform cure for the resulting composite.

In one embodiment, the liquid curable composition may further comprise reinforcing elements including unidirectional fibers, woven fibers, chopped fibers, non-woven fibers or long, discontinuous fibers. Such fibers can be selected from conductive fibers, nonconductive fibers, and a combination thereof.

In particular, the fibers can be selected from conductive fibers, nonconductive fibers, and a combination thereof. In particular, the fibers may be selected from glass, such as S glass, S2 glass, E glass, R glass, A glass, AR glass, C glass, D glass, ECR glass, glass filament, staple glass, T glass, and zirconium glass, carbon polyacrylonitrile, carbon fiber, acrylic, poly-paraphenylene terephthalamide, silica, aramid, boron, polyalkylene, quartz, polybenzimdazole, polyetherketone, polyphenylene sulfide, poly p-phenylen benzo-bisoxazole, silicon carbide, phenolformaldehdye, phthalate, naphthenoate, and combinations thereof.

In one embodiment, the reinforcing element is substantially free of carbon nanotubes.

In another embodiment, when the fiber reinforcement contains conductive fibers, either (i) there must be a nonconductive separator placed between the carbon nanotube sheet and the liquid curable composition or (ii) the carbon nanotube sheet must be at least partially impregnated with a curable resin. The curable resin at least partially impregnated into the carbon nanotube sheet(s) can be the same or different as the curable resin in the prepreg(s).

The composites (and methods of making such) as described herein can be used in the production of a variety of materials, and may be particularly useful in the manufacture and assembly of composite parts for aerospace and automotive applications. Additionally, the presently disclosed composites and methods of making such may have applicability in the production of wind turbine blades, which typically have very thick sections and very thin sections necessitating a high level of control over the curing to avoid high exotherms leading to excessive heating and/or run away cure.

What is claimed is:

1. A method of producing a composite laminate, comprising:
   (i) providing a curable system comprising:
      a stack of two or more prepregs, and
      one or more carbon nanotube sheets, wherein at least one of the carbon nanotube sheets is placed in-between the two or more prepregs and wherein the carbon nanotube sheet is a self-supporting, nonwoven sheet of substantially non-aligned carbon nanotubes, wherein substantially non-aligned means that the degree of vertical alignment of the carbon nanotubes may be less than 30% alignment based on the total number of carbon nanotubes;
      two or more additives selected from a catalyst, a curing agent, an antioxidant, a toughening agent, and a fire retardant; and
   (ii) at least partially curing the curable system subjecting the curable system to alternating electromagnetic fields such that at least a portion of the prepregs are cured.

2. The method of claim 1, wherein each prepreg comprises a mixture of a fibrous reinforcement and a curable resin.

3. The method of claim 2, wherein the fibrous reinforcement is comprised of fibers selected from conductive fibers, nonconductive fibers, and a combination thereof.

4. The method of claim 3, wherein the fibrous reinforcement comprises conductive fibers.

5. The method of claim 4, wherein a nonconductive sheet is placed between each of the one or more carbon nanotube sheets and the prepregs.

6. The method of claim 1, wherein the carbon nanotube sheet further comprises a curable resin incorporated therein.

7. The method of claim 1, wherein the stack of two or more prepregs has a thickness in a range of from 0.1 mm to 160 mm.

8. The method of claim 1, wherein the stack of two or more prepregs comprises three or more prepregs.

9. The method of claim 1, wherein one or more carbon nanotube sheets are placed in the middle of the stack of two or more prepregs such that the thickness of the prepregs is substantially the same on both sides of the one or more carbon nanotube sheets.

10. The method of claim 1, wherein the carbon nanotubes comprise two or more of the following characteristics: (i) a length of greater than 10 nM; (ii) a strength greater than 30 GPa; and (iii) a diameter of less than 10 nM.

\* \* \* \* \*